United States Patent
Kopetzky et al.

[11] Patent Number: 5,588,677
[45] Date of Patent: Dec. 31, 1996

[54] SAFETY BELT TENSIONER FOR MOTOR VEHICLES

[75] Inventors: Robert Kopetzky, Lonsee; Günther Häge, Langenau, both of Germany

[73] Assignee: Takata (Europe) Vehicle Safety Technology GmbH

[21] Appl. No.: 492,286

[22] Filed: Jun. 19, 1995

[30]   Foreign Application Priority Data

Jun. 23, 1994 [DE]  Germany ............... 44 22 022.7

[51] Int. Cl.⁶ .................................................. B60R 22/36
[52] U.S. Cl. .......................................... 280/806; 297/480
[58] Field of Search ........................... 280/806, 801.1, 280/808; 297/480, 483, 468, 486

[56]          References Cited

U.S. PATENT DOCUMENTS

| | | | |
|---|---|---|---|
| 3,606,374 | 9/1971 | Prostran | 297/480 |
| 4,792,158 | 12/1988 | Andersson | 297/480 X |
| 4,913,497 | 4/1990 | Knabel et al. | 297/480 |
| 4,917,210 | 4/1990 | Danicek et al. | 280/806 X |
| 5,188,425 | 2/1993 | Foster et al. | 297/473 |
| 5,288,105 | 2/1994 | Ikegaya et al. | 280/806 |
| 5,290,062 | 3/1994 | Fohl | 280/806 |
| 5,295,714 | 3/1994 | Fohl | 280/806 |

FOREIGN PATENT DOCUMENTS

| | | |
|---|---|---|
| 0186880A3 | 7/1986 | European Pat. Off. . |
| 0306299A1 | 3/1989 | European Pat. Off. . |
| 0415418A2 | 3/1991 | European Pat. Off. . |
| 0502370A1 | 9/1992 | European Pat. Off. . |
| 0567303 | 10/1993 | European Pat. Off. ............ 280/806 |
| 0577073A1 | 1/1994 | European Pat. Off. . |
| 8437589.2 | 8/1986 | Germany . |
| 9112121.3 | 2/1987 | Germany . |
| 4215563A1 | 11/1993 | Germany . |
| 4230663A1 | 3/1994 | Germany . |
| 9408983.3 | 11/1994 | Germany . |
| 4005148 | 1/1992 | Japan .................... 280/806 |

OTHER PUBLICATIONS

European Search Report dated Oct. 30, 1995 re Application No. 95108904.4.
German Search Report dated Jan. 12, 1995 re Application No. P 44 22 022.7.

*Primary Examiner*—Christopher P. Ellis
*Attorney, Agent, or Firm*—Fitch, Even, Tabin & Flannery

[57]           ABSTRACT

A safety belt tensioner for motor vehicles which is securable to the vehicle chassis (12) has an elongate drive device (11) which acts on a flexible draw element (13) displaceable in its longitudinal direction. The flexible draw element is guided from the guide device (11) via a deflection member (14) secured to the chassis to a belt lock part (15) and is attached there for the transmission of a tensile force. The deflection member (14) is simultaneously designed as the mounting element which secures the drive device (11) to the chassis (12).

20 Claims, 1 Drawing Sheet

5,588,677

SAFETY BELT TENSIONER FOR MOTOR VEHICLES

FIELD OF THE INVENTION

The invention relates to a safety belt tensioner for motor vehicles securable to the vehicle chassis, the tensioner comprising an elongate drive device which is to be arranged substantially horizontally in the motor vehicle, a flexible draw element which is displaceable in its longitudinal direction by the drive device and which is guided upwardly from the drive device via a deflection member secured to the vehicle chassis to a belt lock part which cooperates with a counter-piece arranged at the end of a three-point belt or of a lap belt, and which is mounted there so as to transmit a tensile force.

DESCRIPTION OF THE PRIOR ART

It is already known to deflect the flexible draw element which is preferably formed as a wire cable, over deflection members secured directly to the vehicle chassis, into a substantially upwardly pointing direction where the counter-piece connected to the safety belts engages at the belt lock (FR 21 80 151, DE-OS 25 43 068). The separate mounting of the deflection member and of the drive device however requires high effort and complexity.

Furthermore a tensioning device for a rear seat belt in motor vehicles is known (EP 0 186 880 B1) in which the drive device is constructionally united with a deflection block which deflects the flexible draw element from the horizontal direction into a substantially vertical direction. The deflection block with the drive device is in turn secured to the vehicle chassis with special mounting means. In this arrangement the deflection block must first pick up the high deflection forces which arise on triggering of the belt tensioner and must then conduct them to the motor vehicle chassis via the mounting means which secure it to the vehicle chassis. The deflection of the flexible draw element within the deflection block thus requires a correspondingly stable design of the latter.

SUMMARY OF THE INVENTION

The object of the present invention is to make available a further safety belt tensioner of the initially named kind. In particular the safety belt tensioner should be substantially simplified both for the point of view of its manufacture as well as from the point of view of its installation and should be of particularly compact design.

In order to satisfy this object there is provided a safety belt tensioner of the initially named kind which is characterised in that the deflection member is simultaneously designed as a mounting element which secures the drive device to the vehicle chassis, and is directely and firmly connectable to the vehicle chassis.

Through the direct mounting or support of the deflection member on the vehicle chassis intermediate members which would have to be correspondingly massively designed and which must in turn be secured to the vehicle chassis are avoided. Moreover, the deflection member fulfils a double-function in that it serves, apart from its task of deflecting the flexible draw element also for the mounting of the drive device or of projections and/or angled portions provided on the drive device. The deflection member thus not only relieves the components connected to and preferably formed in one piece with the drive device, i.e. components such as projections and/or angled portions, from deflection forces, but rather simultaneously serves for their firm connection to the vehicle chassis.

Although the deflection member can fundamentally form the sole mounting for the drive device at the vehicle chassis it is possible to provide one or several additional mounting points for the attachment to the chassis at the end of the drive device remote from the deflection member.

Advantageous further developments of the invention are characterised by the claims 2 to 6.

A further problem in such belt tensioners lies in connecting the belt lock part to the drive device in such a way that it is located after installation at the vehicle chassis in a position at the vehicle seat such that the vehicle occupant can insert the counter-piece connected to the belt into the belt lock part without problem. In order to achieve this the flexible draw element can for example be made so stiff that it is able to hold the belt lock part in an upright position. In this case the flexible draw element can however not be designed solely taking account of the tensile force which is required but must rather be overdimensioned in order to achieve the required stiffness.

A further object of the invention is to provide a belt tensioner of the initially named kind in which the tensioning element can have a low inherent stiffness while still permitting the belt lock part to be reliably held in an upright position.

In order to satisfy this object of the invention there is provided a belt tensioner of the initially named kind which is characterised in that a projection extends from the drive device where the draw element emerges up to and into the region of the deflection member directly secured to the vehicle chassis; and in that the projection has an upwardly directed angled portion at which the belt lock part is elastically and resiliently retractably arranged relative to the angled portion via a spring cuff.

The basic concept of this embodiment is not only to be seen in the fact that the belt lock part is stably held at the angled portion via a spring cuff but rather also in that the deflection member which has alone to transmit the considerable deflection forces onto the vehicle chassis is located in the region where the projection of the drive device undergoes a transition into the substantially upwardly directed angled portion. In this manner the axis of the spring cuff, of the angled portion and of the draw member which extends therein are at least substantially aligned with one another in advantageous manner.

The invention is used with particular advantage in a belt tensioner in which the flexible draw element is guided via the belt lock part in the manner of a single block and tackle. A belt tensioner of this kind is known per se from DE-OS 42 30 665.

A substantial problem which such belt tensioners which operate in the manner of a block-and-tackle is the anchoring of the free end of the flexible draw element opposed to the drive device. This must be so anchored in the projection or in the angled portion of the drive device that it cannot tear free nor break out parts of the projection of the angled portion.

A further object of the invention thus lies in so designing a belt tensioner in accordance with the preamble of claim 8 that a force multiplication takes place from the drive device to the belt lock part in the sense of an increase of the pull-back force and a corresponding reduction of the pull-back path, without the reliable anchoring of the free end of the flexible draw element being impaired.

In order to satisfy this object there is provided a safety belt tensioner of the initially named kind which is characterised in that a return part of the draw member is led back via a deflection element secured to the belt lock part to the drive device or to a projection secured thereto or to an angled portion starting from the projection and is secured there at its free end. An advantageous further development is characterised by claim 9.

Advantageous developments of the subject of the invention also can be seen from claims 11 to 20.

BRIEF DESCRIPTION OF THE DRAWINGS

The invention will now be described in the following by way of example and with reference to the drawing in which are shown.

DETAILED DESCRIPTION OF THE PREFERRED EMBODIMENT

Figure 1:
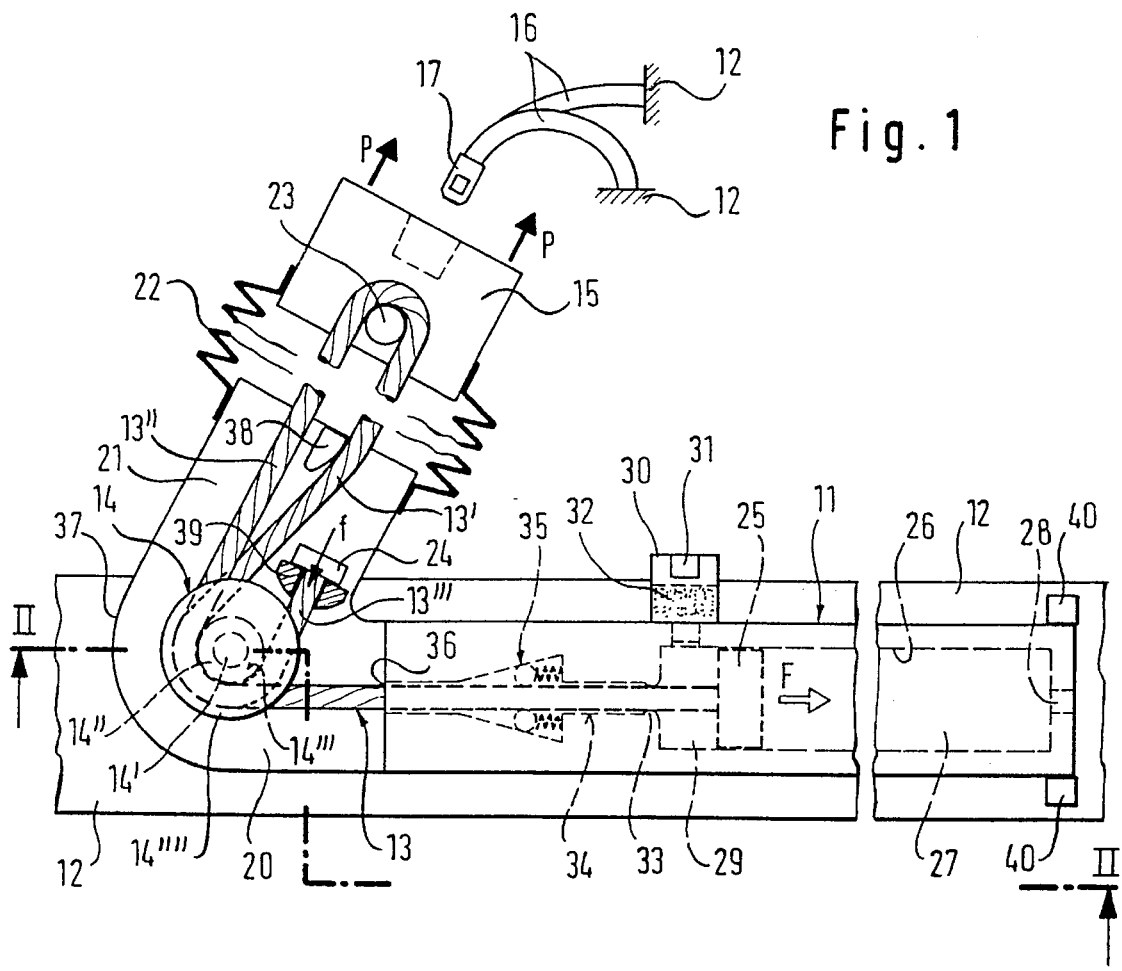
FIG. 1 a schematic partly sectioned side view of a belt tensioner of the invention which is mounted on a vehicle chassis, and FIG. 2 a schematic sectional view on the line II—II in FIG. 1.

In accordance with the drawing a drive device 11 which is horizontally arranged on the vehicle chassis 12 is formed as a pyrotechnically operating piston-in-cylinder unit having a piston 25 and a cylinder 26. The rear cylinder space 27 of the piston-in-cylinder unit at the end remote from the piston 25 has an opening 28 leading to the atmosphere while the cylinder space 29 located in front of the piston 25 is connected to a pyrotechnical pressure generating device 30 which can be connected via a socket 31 to a non-illustrated acceleration sensor. In the event of an accident-dependent acceleration the sensor connected at 31 brings about a triggering of the charge 32 located in the pyrotechnical pressure generating device 30 and a high pressure abruptly builds up in the cylinder space 29 which displaces the piston 25 rearwardly in the direction of the arrow F.

A flexible draw element 13 formed as a wire cable is fixedly connected to the center of a piston 25 and passes through a sealed bore 33 at the front end of the cylinder 26 and is then guided through a straight channel 34. In the region of the straight channel a pull-back blocking device 35, which is only schematically illustrated, is arranged around the wire cable 13.

Figure 2:
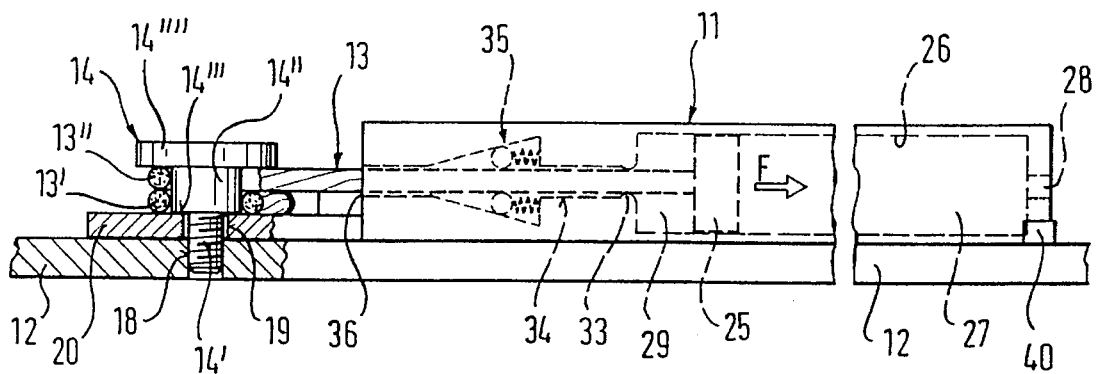

At 36 the wire cable 13 emerges out of the drive device 11 and extends in a straight line to the circumference of a deflection member 14 which has a bolt section 14' provided with an external thread at the bottom as seen in FIG. 2. Above this bolt section there is a deflection section 14" of larger diameter and at the top a head guide section 14"" having an even larger diameter.

A plate-like projection 20 extends from the front end of the drive device 11 in unitary manner up to and beyond the deflection member 14. It is rounded off at the top at 37 and undergoes a transition there into an angled portion 21 which points obliquely upwardly and which can likewise be of plate-like design.

As can be seen in particular from FIG. 2 the projection 20 has a through-bore 19 of somewhat larger diameter in the region of a threaded bore 18 provided in the vehicle chassis 12 and the bolt section 14' of the deflection member 14 is screwed into the threaded bore 18 through the bore 19. In doing so the horizontal ring step 14''' located between the bolt portion 14' and the deflection portion 14" contacts the surface of the projection 20 around the through-bore 19 and thus presses the projection 20 against the vehicle chassis 12 so that the projection 20 including the drive device 11 and the angled portion 21 which are formed in one piece with it are securely fastened to the vehicle chassis 12. In place of the bolt section 14' a downwardly open sleeve section provided with an internal thread could also be provided which is screwed onto a threaded bolt which is secured to the chassis 12; for example by welding, whereby the projection 20 can likewise be pressed against the chassis 12.

The wire cable 13 has a leading part 13" which is guided in accordance with FIG. 2 around the upper region of the deflection section 14" until it has achieved the direction relative to the belt lock part 15 evident from FIG. 1. The leading part 13" then extends within the angled portion 21, which is of correspondingly hollow design, up to the belt lock part 15 at which there is located a deflection roller 23 around which the wire cable 13 is guided through ca. 180°. The return part 13' of the wire cable 13 formed in this way is then so deflected around a deflecting part 38 fixedly arranged on the angled portion 21 that it reaches the front region of the deflection portion 14" where it is laid beneath the leading part 13" (as seen in FIG. 2) and is led in similar manner to the latter around the deflection section 14".

While the leading part 13" wraps around the deflection section 14" over an angle of somewhat more than 90° the wrapping angle of the return part 13' amounts to somewhat more than 180°. The free end 13''' of the return part 13' is provided with a fastening head 24 by means of which it is secured at an abutment collar 39 of the projection 20 of the angled portion 21 against a movement in the direction of the arrow f.

Above the belt lock part 15, the technical particulars of which are not shown in detail there is a reduced scale reproduction of the lock counter-part 17 which cooperates with it and from which the two parts 16 of a three-point belt 16 extend to upper and lower regions of the vehicle chassis 12 where they are secured in known manner.

The operation of the described belt tensioner is as follows:

The belt tensioner is so assembled in the manufacturer's works that the drive device 11, the projection 20, the angled portion 21, the spring cuff 22 and the belt lock part 15 form a constructional unit in which the cable 13 is arranged and fixed in the manner as shown in the drawing. The deflection member 14 is preferably already plugged into the through-bore 19 and is for example secured against dropping out of the bore 19 by a spring ring set in place from below in FIG. 2. In this form the belt tensioner is delivered to the car manufacturer.

The latter must only provide the threaded bore 18 in the vehicle chassis 12 at the correct position and—if necessary after removal of the aforementioned spring—screw the deflection member 14 by means of the bolt section 14' into the threaded bore 18 until the ring step 14''' has firmly pressed the projection 20 against the vehicle chassis 12.

The belt tensioner is now so secured to the vehicle chassis 12 that the deflection forces which arise at the deflection member 14 on triggering the pyrotechnical pressure generating device 30 are not first introduced into the vehicle chassis 12 via the projection 20 which surrounds the deflection member but rather directly into the vehicle chassis 12 via the bolt section 14'. In order to avoid a turning of the arrangement about the axis of the deflection member 14 projections 40 can be provided directly adjacent the rear end of the drive device 11 on the vehicle chassis 12. The rear end of the drive device 11 is introduced between these projections 40 in the manner which can be seen from FIGS. 1 and 2 during installation before the deflection member 14 is screwed tight. After After the installation the acceleration sensor which is not shown is connected to the socket 31. If now an accident-dependent acceleration occurs then the sensor triggers the pyrotechnical charge 32 and a high pressure is abruptly generated in the cylinder space 29 which accelerates the piston 25 in the direction of the arrow F. In this way the wire cable 13 is displaced to the right and the deflection roller 23 of the belt lock part 15 is drawn downwardly. During this the spring cuff 22 which is shown in greatly shortened form in FIG. 1 is axially compressed. The consequence is a tensioning of the belt 16, in so far as the belt had previously being closed by introduction of the counter-piece 17 into the belt lock part 15.

As soon as the piston 25 has reached the rear end of the cylinder 26 and the belt lock part 15 is located in the further downwardly displaced position then the person secured by the belts 16 falls forwardly into the belt and a considerable tensile force is exerted in the direction of the arrow P in FIG. 1 onto the belt lock part 15. This in turn attempts to pull out the leading part 13 of the wire cable 13 via the deflection roller 23. However the draw back blocking device 25 is then effective and effectively prevents the wire cable 13 being pulled out again. The considerable deflection forces which hereby arise are also transmitted directly to the vehicle chassis from the deflection member 14 which is screwed directly to the chassis 12. The deflection member 14 also directly passes on the substantially equal size deflection forces exerted by the return part 13' directly to the vehicle chassis 12.

The minor torque which arises because of the radial spacing of the wire cable part which is guided around the deflection section 14" from the centerpoint of the deflection member 14 is straightforwardly born by the expedient projections 40 provided for this purpose at the drive device 11. The substantial forces are thus directly transmitted from the wire cable 13 via the deflection member 14 to the chassis 12.

At the peripheral section 14" a rotatable cable roller can also be provided for the low friction deflection of the wire cable 13 guided around the cable reel, which does not however change anything with respect to the direct transmission of the deflection forces via the deflection member 14 to the vehicle chassis 12. In each case the projection 20 and the angled portion 21 do not have to bear any deflection forces.

We claim:

1. Safety belt tensioner for motor vehicles which can be mounted on a vehicle chassis (12), the tensioner comprising an elongate drive device (11) which is to be arranged substantially horizontally in the motor vehicle, a flexible draw element (13) which is displaceable in its longitudinal direction by the drive device (11) and which is guided upwardly from the drive device (11) via deflection member (14), which is secured to the vehicle chassis (12), to a belt lock part (15) which cooperates with a counter-piece (17) arranged at the end of a three-point belt or of a lap belt (16) and which is mounted there so as to transmit a tensile force, characterised in that:

the deflection member (14) is simultaneously designed as a mounting element which secures the drive device (11) to the vehicle chassis (12), and is directly and firmly connectable to the vehicle chassis (12);

the deflection member has a bolt or sleeve section (14') mountable to the vehicle chassis (12) and a deflection section (14"); and the deflection section (14") has a round peripheral surface which is dimensionally matched to the draw element (13) and which projects radially outwardly beyond the bolt or sleeve section (14') to form ring step (14''') between the bolt or sleeve section and the deflection section; and a projection (20) of the drive device (11) having a through bore (19) through which the bolt or sleeve section can be inserted with the ring step abutting and pressing against the projection.

2. Safety belt tensioner in accordance with claim 1, characterised in that the bolt section (14') is provided with an external thread or sleeve section is provided with an internal thread and the bolt section can be screwed into a threaded bore (18) of the vehicle chassis (12) or the sleeve section can be screwed onto a threaded spigot of the vehicle chassis (12).

3. Safety belt tensioner in accordance with claim 1, characterised in that a head and guiding section (14''') which extends radially beyond the deflection section (14") is provided on the deflection member (14) at the end of the deflection section (14") remote from the bolt or sleeve section (14').

4. Safety belt tensioner in accordance with claim 1, characterised in that the projection (20) and the deflection member (14) are secured to the vehicle chassis and are provided directly at the side of the drive device (11) where the draw element (13) emerges.

5. Belt tensioner in accordance with claim 1, characterised in that the flexible draw element (13) is a wire cable.

6. Belt tensioner in accordance with claim 1, characterised in that the drive device (11) is a piston-in-cylinder (25, 26) arrangement which is to be horizontally disposed in the vehicle, with the piston (25) being fixedly connected to a force engagement end of the flexible draw member (13) and being loadable from this mounting side by the pressure generated by a pyrotechnical charge (31).

7. Belt tensioner in accordance with claim 1, characterised in that a roller is rotatably arranged on the deflection section (14").

8. A tensioner for tensioning seat belts of motor vehicles with the belt tensioner capable of being mounted to the vehicle chassis, the tensioner comprising:

an elongated drive device having a lengthwise axis and which is to be arranged substantially horizontally in the motor vehicle;

a deflection member secured to the vehicle chassis adjacent one end of the drive device;

a flexible draw element extending from the one end of the drive device for being pulled and exerting a tensioning force on the seat belt, the flexible draw element being guided upwardly from the drive device by the deflection member; and a deflection element which is arranged to be operatively connected to the seat belt, the deflection element guiding a return part of the flexible draw element downwardly back towards the deflection member with a free end of the flexible draw element being secured to the drive device.

9. The tensioner of claim 8, wherein the drive device includes a projection attached thereto at the one end thereof and extending therefrom in the direction of its lengthwise axis.

10. Belt tensioner in accordance with claim 9, wherein said deflection member includes a deflection section and the draw element includes a leading part extending upwardly from the deflection member towards the deflection element along one side of the deflection section with the return part of the draw element being guided to the deflection member (14) at the same side thereof as the leading part of the draw element and is at least partly wrapped around the deflection and is secured by its free end to the projection.

11. Belt tensioner in accordance with claim 10, wherein a roller is rotatably arranged on the deflection section.

12. Belt tensioner in accordance with claim 8 further including securing means between the drive device and the vehicle chassis at the ether end of the drive device to prevent a rotation of the drive device about the deflection member.

13. Belt tensioner in accordance with claim 8, wherein the flexible draw element is a wire cable.

14. Belt tensioner in accordance with claim 8, wherein the drive device is a piston-in-cylinder arrangement which is to be horizontally disposed in a vehicle, with the piston being fixedly connected to a force engagement end of the flexible draw member and being loadable from this mounting side by the pressure generated by a pyrotechnical charge.

15. Safety belt tensioner for motor vehicles which can be mounted on a vehicle chassis (12), the tensioner comprising an elongate drive device (11) which is to be arranged substantially horizontally in the motor vehicle, a flexible draw element (13) which is displaceable in its longitudinal direction by the drive device (11) and which is guided upwardly from the drive device (11) via a deflection member (14) secured to the vehicle chassis (12) to a belt lock part (15) which cooperates with a counter-piece (17) arranged at the end of a three-point belt or of a lap belt (16) and which is mounted there so as to transmit a tensile force, characterised in that a projection (20) extends from the drive device (11) where the draw element (13) emerges up to and into the region of the deflection member (14) which is directly secured to the vehicle chassis (12); and in that the projection (20) has an upwardly directed angled portion (21) at which the belt lock part (15) is elastically and resiliently retractably arranged relative to the angle portion (21) via a spring cuff (22).

16. Belt tensioner in accordance with claim 15, characterised in that further securing means (40) are provided between the drive device (11) and the vehicle chassis (12) at the end region of the drive device (11) remote from the deflection member (14), said securing means being configured to prevent a rotation of the drive device (11) about the deflection member (14).

17. Belt tensioner in accordance with claim 15, characterised in that the flexible draw element (13) is a wire cable.

18. Belt tensioner in accordance with claim 15, characterised in that the drive device (11) is a piston-in-cylinder (25, 26) arrangement which is to be horizontally disposed in the vehicle, with the piston (25) being fixedly connected to a force engagement end of the flexible draw member (13) and being loadable from this mounting side by the pressure generated by a pyrotechnical charge (31).

19. Belt tensioner in accordance with claim 15, characterised in that a roller is rotatably arranged on the deflection section (14").

20. Safety belt tensioner for motor vehicles which can be mounted on a vehicle chassis (12), the tensioner comprising an elongate drive device (11) which is to be arranged substantially horizontally in the motor vehicle, a flexible draw element (13) which is displaceable in its longitudinal direction by the drive device (11) and which is guided upwardly from the drive device (11) via a deflection member (14) secured to the vehicle chassis (12) to a belt lock part (15) which cooperates with a counter-piece (17) arranged at the end of a three-point belt or of a lap belt (16) and which is mounted there so as to transmit a tensile force, characterised in that the deflection member (14) is simultaneously designed as a mounting element which secures the drive device (11) to the vehicle chassis (12), and is directly and firmly connectable to the vehicle chassis (12); and further including securing means (40) between the drive device (11) and the vehicle chassis (12) at the end region of the drive device (11) remote from the deflection member (14), said securing means being configured to prevent rotation of the drive device (11) about the deflection member (14).

* * * * *

UNITED STATES PATENT AND TRADEMARK OFFICE
CERTIFICATE OF CORRECTION

PATENT NO. : 5,588,677
DATED : December 31, 1996
INVENTOR(S) : Robert E. KOPETZKY et al.

It is certified that error appears in the above-indentified patent and that said Letters Patent is hereby corrected as shown below:

Claim 1, column 6, line 7, after "form" insert --a--.
Claim 12, column 7, line 14, change "ether" to --other--.

Signed and Sealed this

Eighth Day of April, 1997

*Attest:*

BRUCE LEHMAN

*Attesting Officer*     *Commissioner of Patents and Trademarks*